J. P. BALL.
METHOD OF TREATING SEWAGE.
APPLICATION FILED OCT. 22, 1918.

1,364,676.

Patented Jan. 4, 1921.

Inventor,
John P. Ball

UNITED STATES PATENT OFFICE.

JOHN P. BALL, OF CHICAGO, ILLINOIS.

METHOD OF TREATING SEWAGE.

1,364,676.  Specification of Letters Patent.  Patented Jan. 4, 1921.

Application filed October 22, 1918. Serial No. 259,292.

*To all whom it may concern:*

Be it known that I, JOHN P. BALL, a citizen of the United States, residing at Chicago, in the county of Cook and State of Illinois, have invented certain new and useful Improvements in Methods of Treating Sewage, of which the following is a description, reference being had to the accompanying drawings, which form a part of my specification.

My invention relates to a method for treating sewage, trade waste and the like, through the utilization of means or mechanisms whereby a current of air is employed for the purpose of inducing separation of the liquid from the solids.

As is considered by sanitary engineers, a most important step in the purification of sewage consists in the collection and disposition of the sewage sludge, which heretofore has usually been collected by means of settling chambers or septic tanks.

I have discovered that the passage of a current of air through the agitated sewage will produce a more or less anhydrous sludge in an exhaust air chamber.

My invention contemplates mechanisms or devices of such character as to enable the carrying out of the method; such mechanism, in its preferred form, utilizing a centrifugal element for comminuting the sewage or sludge in conjunction with a superposed annular discharge passage for exhausting from said member; a plurality of receiving chambers for the particle laden current; together with means for controlling the current as well as means for operating the mechanism. My invention is especially applicable to the purification of sewage in lavatories, latrines in army encampments where the disposal of waste is a difficult task.

As exemplifications of means for carrying out my invention I will refer to the drawings wherein:—

Figure 1:
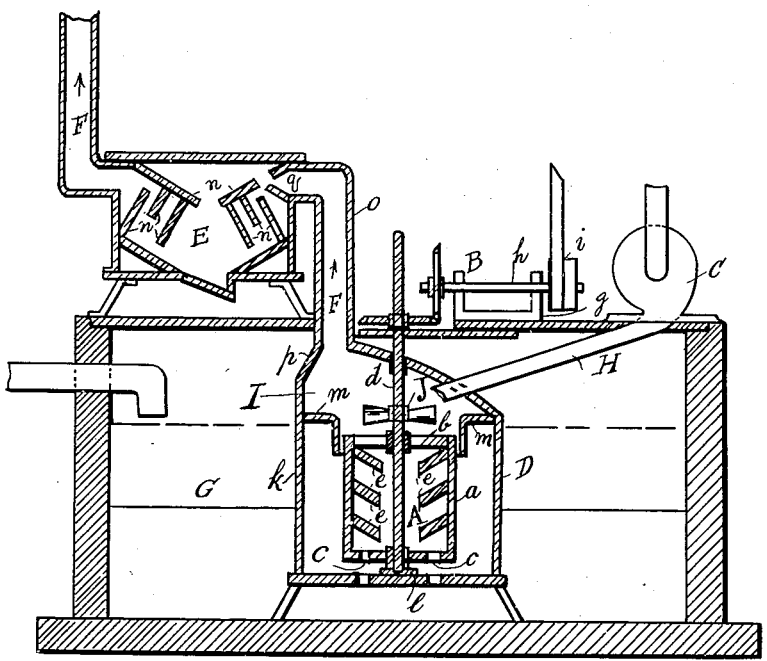
Figure 1 is a vertical sectional view of the preferred form of such means.

Referring to Fig. 1, A indicates in general a revolving comminuting element driven by the mechanism referred to in general by the reference character B. C indicates a blower of any suitable type whereby air is forced into a casing D arranged in the sewage sump or basin G; the casing D being of suitable construction and preferably supported and slightly elevated from the bottom of the sump or basin, as shown in the figure. The casing D is preferably provided with a discharge conduit F preferably leading from the top of the casing and out through the top or cover of the sump or basin. The discharge conduit F is shown communicating at a suitable point with a sludge or particle collecting chamber E, the opposite end whereof is provided with what may be termed a continuation of the discharge conduit F whereby the gases are conveyed to the atmosphere at a suitable elevation. The sump or basin and the casing construction, as well as the blower, may be of any suitable construction and arrangement capable of vaporizing the moisture from the sludge or sewage; the construction, however, contemplating means for creating the necessary current and for the collection and discharge of the sludge in the form of manurial product.

The agitator or comminuting member A, in the specific form illustrated in Fig. 1, comprises a cylindrical body, indicated at $a$, with an open top and a perforated bottom, indicated at $c$. The cylinder is mounted in a suitable manner on the centrally located revoluble shaft $d$ which is disposed therethrough and protrudes from the cylinder so as to provide a suitable mounting on the bottom of the casing D, while the upper end of the shaft is disposed through the hood or drum formation I of the casing and also extends through the top of the sump or basin. The cylinder $a$ is provided with inwardly and downwardly disposed flanges or blades $e$ whereby the sewage or sludge may be thoroughly agitated upon the rotation of the drum or cylinder $a$; the sewage finding entrance through suitable openings in the bottom of the casing D and thence into the cylinder $a$ through the perforated bottom; it being understood that the cylinder may be provided with any suitable number of blades $e$. It is evident from the construction shown and just described that the sewage will be subjected to considerable agitation or comminuting action through the rotation of the cylinder.

The cylinder $a$ is driven through the medium of the shaft $d$, the upper end whereof is provided with suitable gearing adapted to mesh with the gearing on the drive shaft $h$ mounted in a suitable frame $g$ on the cover of the basin or sump; the drive shaft $h$ being shown provided with a fast and loose pulley at $i$ in order that the cylinder may be set in operation when the belt or other driving medium is in contact with the fast pulley.

The blower C is adapted to force a current of air through the conduit H into the upper end of the casing D, or rather into the chamber formed in the drum I at the upper end of the casing; the conduit H being arranged so as to discharge the current of air centrally or substantially so above the open end of the cylinder and therefore above the agitated sewage.

The upper end of the casing D is provided with the inwardly and downwardly disposed circumferential flange, as at $m$, adapted to overlap the upper end of the cylinder $a$ so as to provide a concentration of the liquid or sewage and cause the blast or current of air to be effective across the open top of the cylinder and therefore to be forced into intimate relation with the agitated sewage.

The conduit F communicates with the drum portion I of the casing D (being preferably made integral with the drum as indicated at $p$) preferably at its uppermost point and at the opposite side from that where the air conduit H enters the casing, so that the air current will be induced to flow upward through conduit F and be conveyed into a collecting chamber E, which is preferably in the nature of a cylinder; the conduit F being shown communicating with the chamber or cylinder E at one end thereof and preferably near the top; the conduit terminating in a restricted orifice preferably funnel-shape, as indicated at $q$. The chamber or cylinder E is provided with internal chambers formed by the baffles $n$ which are arranged in staggering relation; with the walls of the internal chambers preferably made sloping toward the lower central point of the chamber or cylinder E, as shown in the drawing. The current of air, which will entrain small particles of the sewage, will be forced or caused to circulate about the baffles and the inner walls before the current can find egress through the outlet conduit F which communicates with the opposite upper end of the chamber or cylinder E; the discharge outlet or tube F being adapted to exhaust the gases and act as a vent to carry the noxious gases to an elevated plane preferably above the house tops. By reason of the construction of the inner walls and baffles within the chamber E, it is evident that any particles of sludge or sewage that are held in suspension in the blast of air will be collected at a central point in the bottom of the collector E; the precipitated or collected mass at the same time being more or less dried by the air current passing through the cylinder E. The central bottom point of the chamber E is provided with a suitable outlet provided with a closure which enables the solids to be withdrawn from time to time and permit the use of the solids as heretofore mentioned.

In the construction shown in Fig. 1, I show the shaft $d$ provided with a blade or paddle at J formed so as to assist in directing the air current toward conduit F and thus assist in the operation of drying the sewage and causing the air current with the entrained particles of sewage to be forced through conduit F and into collecting chamber E.

The degree of operation or volume of air current may, of course, be controlled in any suitable manner, by the regulation of the blower C as well as the regulation of the driving mechanism B.

Figure 2:
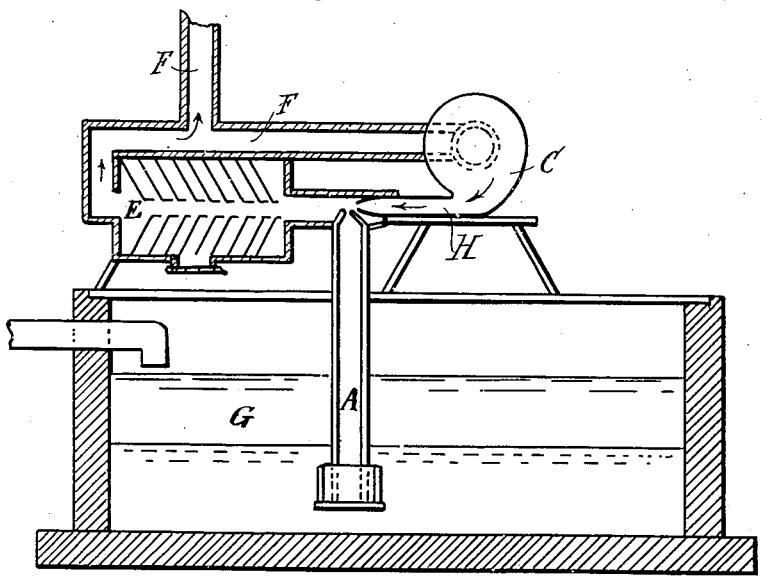
Fig. 2 is a similar sectional view of a modified form.

In the modification shown in Fig. 2, I provide the catch basin or sump G with a conduit A disposed to a point slightly above the bottom of the sump or basin; with the lower end of the conduit provided with a suitable screen or cage so as to prevent the orifice from being clogged by large sized particles and thus become obstructed. This conduit terminates at its upper end, above the cover of the basin or sump in a restricted or funnel shaped orifice which terminates at a point in proximity to the restricted orifice of the air conduit H which communicates with the blower C; that is to say the orifice of the air conduit H is disposed substantially at right angles to the upper orifice of conduit A in order that the forced air passing across the restricted orifice of conduit A will induce a suction action whereby the moisture will be drawn upward from the basin or sump through conduit A and be caused to flow into the collecting chamber E, which latter is provided with a series of fins or baffles which are adapted to collect the entrained particles of sewage before the air current reaches the opposite end of the collecting chamber E which is provided with the outlet conduit F leading to the atmosphere. In this construction shown in Fig. 2 the comminuting means is omitted.

What I claim is:—

1. The herein described method, which consists in subjecting a collected mass of sludge laden sewage to a forced current of air so as to withdraw the noxious gases with entrained particles of sewage from said mass, and passing said sewage laden gases through a collecting medium.

2. The herein described method, which consists in subjecting a collected mass of sludge laden sewage to the action of a comminuting element forcing a current of air into said comminuting element in such manner as to cause the noxious gases to be forced through a discharging member with entrained particles of sewage, and providing means communicating with said conduit whereby the entrained particles in said gas laden current will be collected and the noxious gases discharged into the atmosphere.

3. The herein described method, which consists in subjecting a collected mass of sludge laden sewage to a forced current of air whereby the noxious gases with entrained particles of sewage are withdrawn from said collected mass, and providing means in the path of said gas laden current whereby the entrained particles will be precipitated and the gases conveyed to the atmosphere.

4. The herein described method, which consists in providing a collector for sludge laden sewage, take-off means arranged in said collector, forcing a current of air through said take-off means whereby the noxious gases with entrained particles of sewage will be caused to flow through said take-off means, and providing means in the path of the gas laden air current passing through said take-off means whereby the entrained particles will be collected while the noxious gases will be conveyed to the atmosphere.

JOHN P. BALL.

Witnesses:
CLOVIS C. VIGUERIE,
ELIZA ST. MARTIN.